US010552972B2

(12) United States Patent
Ahn et al.

(10) Patent No.: US 10,552,972 B2
(45) Date of Patent: Feb. 4, 2020

(54) APPARATUS AND METHOD WITH STEREO IMAGE PROCESSING

(71) Applicant: Samsung Electronics Co., Ltd., Suwon-si (KR)

(72) Inventors: Minsu Ahn, Yongin-si (KR); Jiyeon Kim, Hwaseong-si (KR); Hyong Euk Lee, Suwon-si (KR); Young Hun Sung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 116 days.

(21) Appl. No.: 15/677,213

(22) Filed: Aug. 15, 2017

(65) Prior Publication Data

US 2018/0108142 A1    Apr. 19, 2018

(30) Foreign Application Priority Data

Oct. 19, 2016  (KR) .................. 10-2016-0135589

(51) Int. Cl.
*G06T 7/593* (2017.01)
*G06T 7/00* (2017.01)
*G06K 9/46* (2006.01)
*G06T 7/586* (2017.01)
*H04N 13/128* (2018.01)

(52) U.S. Cl.
CPC .......... *G06T 7/593* (2017.01); *G06K 9/4604* (2013.01); *G06K 9/4671* (2013.01); *G06T 7/586* (2017.01); *G06T 7/97* (2017.01); *H04N 13/128* (2018.05); *G06T 2207/10012* (2013.01)

(58) Field of Classification Search
None
See application file for complete search history.

(56) References Cited

U.S. PATENT DOCUMENTS

| 2007/0086646 | A1* | 4/2007 | Yang | G06K 9/20 |
| | | | | 382/154 |
| 2009/0180682 | A1* | 7/2009 | Camus | G06T 7/0002 |
| | | | | 382/154 |
| 2011/0304618 | A1 | 12/2011 | Chen et al. | |
| 2013/0314501 | A1 | 11/2013 | Davidson et al. | |
| 2014/0176676 | A1 | 6/2014 | Lin et al. | |
| 2014/0218488 | A1* | 8/2014 | Didyk | G06T 5/001 |
| | | | | 348/51 |

(Continued)

FOREIGN PATENT DOCUMENTS

| KR | 10-2013-0142008 A | 12/2013 |
| KR | 10-2014-0109168 A | 9/2014 |

(Continued)

OTHER PUBLICATIONS

Silva, César, and José Santos-Victor. "Intrinsic images for dense stereo matching with occlusions." European Conference on Computer Vision. Springer, Berlin, Heidelberg, 2000. (Year: 2000).*

(Continued)

*Primary Examiner* — Andrae S Allison
(74) *Attorney, Agent, or Firm* — NSIP Law

(57) ABSTRACT

An image processing apparatus includes a processor configured to calculate a curvature value of a first point in stereo images based on a disparity value corresponding to the first point, and refine the disparity value based on the curvature value.

22 Claims, 8 Drawing Sheets

(56) References Cited

U.S. PATENT DOCUMENTS

| | | | |
|---|---|---|---|
| 2014/0241612 A1 | 8/2014 | Rhemann et al. | |
| 2014/0368506 A1 | 12/2014 | Abbott et al. | |
| 2015/0022631 A1 | 1/2015 | Chang et al. | |
| 2016/0048970 A1* | 2/2016 | Loghman | G06T 7/593 |
| | | | 382/154 |

FOREIGN PATENT DOCUMENTS

| | | | |
|---|---|---|---|
| KR | 10-2015-0039463 A | 4/2015 |
| KR | 10-2015-0105069 A | 9/2015 |
| KR | 10-2016-0035503 A | 3/2016 |

OTHER PUBLICATIONS

Zucker, Steven W. "Stereo, shading, and surfaces: Curvature constraints couple neural computations." Proceedings of the IEEE 102.5 (2014): 812-829. (Year: 2014).*

Manap, Nurulfajar Abd, and John J. Soraghan. "Disparity refinement based on depth image layers separation for stereo matching algorithms." Journal of Telecommunication, Electronic and Computer Engineering (JTEC) 4.1 (2012): 51-64. (Year: 2012).*

Jiao, J., Wang, R., Wang, W., Dong, S., Wang, Z., & Gao, W. (2014). Local stereo matching with improved matching cost and disparity refinement. IEEE MultiMedia, 21(4), 16-27. (Year: 2014).*

Banno et al, Disparity map refinement and 3D surface smoothing via directed anisotropic diffusion, Computer Vision and Image Understanding 115 (2011) 611-619 (Year: 2011).*

Wang, W., & Zhang, C. (May 2012). Local disparity refinement with disparity inheritance. In 2012 Symposium on Photonics and Optoelectronics (pp. 1-4). IEEE. (Year: 2012).*

* cited by examiner

210

220

APPARATUS AND METHOD WITH STEREO IMAGE PROCESSING

CROSS-REFERENCE TO RELATED APPLICATIONS

This application claims the benefit under 35 USC 119(a) of Korean Patent Application No. 10-2016-0135589 filed on Oct. 19, 2016, in the Korean Intellectual Property Office, the entire disclosure of which is incorporated herein by reference for all purposes.

BACKGROUND

1. Field

The following description relates to an image processing apparatus and method that refine a corresponding relationship between stereo images based on curvature values in the stereo images.

2. Description of Related Art

Generally, to extract depth information, a scheme of calculating a disparity value between corresponding pixels in stereo images is used. However, in a low texture environment in which it is difficult to correctly determine a corresponding relationship between pixels in stereo images, an error in the corresponding relationship frequently occurs, which causes an error in calculation of depth information.

To reduce errors in calculation of depth information in the low texture environment, a scheme of detecting an edge in an image and correcting an error is used. However, when an error occurs in a corresponding relationship between pixels or when the corresponding relationship between the pixels is not identified, the error may still remain around the edge of the image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image processing apparatus includes a processor configured to calculate a curvature value of a first point in stereo images based on a disparity value corresponding to the first point, and refine the disparity value based on the curvature value.

The image processing apparatus may further include a memory configured to store instructions; and the processor may be further configured to execute the instructions to configure the processor to calculate the curvature value of the first point in the stereo images based on the disparity value corresponding to the first point, and refine the disparity value based on the curvature value.

The calculator may be further configured to calculate a depth value corresponding to the first point based on the disparity value, and calculate the curvature value based on the depth value.

The calculator may be further configured to extract an intrinsic image from at least one of the stereo images, and calculate the curvature value based on the intrinsic image.

The calculator may be further configured to extract a shading component from the at least one of the stereo images based on the intrinsic image, and calculate the curvature value based on the shading component.

The calculator may be further configured to determine a validity of the curvature value corresponding to the first point based on a distribution of curvature values respectively corresponding to points in at least one area of the stereo images.

The curvature value may be associated with a curvature based on a direction of a disparity between the stereo images.

The disparity refiner may be further configured to determine whether a corresponding relationship between the stereo images is erroneously set at the first point, and delete the corresponding relationship in response to a result of the determining being that the corresponding relationship is erroneously set.

The disparity refiner may be further configured to identify an area that is visible in one of the stereo images but is not visible in another one of the stereo images based on a distribution of curvature values respectively corresponding to points in at least one area of the stereo images, and determine that the corresponding relationship is erroneously set at the first point in response to the first point being located in the identified area.

The disparity refiner may be further configured to extract an edge based on a color value corresponding to each of points in at least one area of the stereo images, identify a discontinuous area based on the extracted edge, and refine a disparity value corresponding to the discontinuous area.

In another general aspect, a image processing apparatus includes a processor configured to generate a disparity map based on a corresponding relationship between stereo images, extract an intrinsic image from at least one of the stereo images, and calculate a curvature value corresponding to each of points in at least one area of the stereo images based on the intrinsic image and the disparity map.

The image processing apparatus may further include a memory configured to store instructions; and the processor may be further configured to execute the instructions to configure the processor to generate the disparity map based on the corresponding relationship between the stereo images, extract the intrinsic image from the at least one of the stereo images, and calculate the curvature value corresponding to each of the points in the at least one area of the stereo images based on the intrinsic image and the disparity map The curvature calculator may be further configured to extract a shading component from the at least one of the stereo images based on the intrinsic image, and calculate the curvature value based on the shading component.

The curvature calculator may be further configured to determine a validity of the curvature value based on a distribution of curvature values respectively corresponding to points in at least one area of the stereo images.

The processor further may include a disparity refiner configured to refine a disparity value in the disparity map corresponding to each of the points in the at least one area based on the curvature value.

In another general aspect, an image processing method includes calculating a curvature value of a first point in stereo images based on a disparity value corresponding to the first point; and refining the disparity value based on the curvature value.

The calculating may include extracting an intrinsic image from at least one of the stereo images; and calculating the curvature value based on the intrinsic image.

The refining may include determining whether a corresponding relationship between stereo images is erroneously set at the first point; and deleting the corresponding relationship in response to a result of determining being that the corresponding relationship is erroneously set.

The determining may include identifying an area that is visible in one of the stereo images but is not visible in another one of the stereo images based on a distribution of curvature values respectively corresponding to points in at least one area of the stereo images; and determining that the corresponding relationship is erroneously set at the first point in response to the first point being located in the identified area.

In another general aspect, a non-transitory computer-readable medium stores instructions that, when executed by one or more processors, cause the one or more processors to perform the image processing method described above.

In another general aspect, an image processing method includes generating a disparity map based on a corresponding relationship between pixels in stereo images; identifying an area that is visible in one of the stereo images but is not visible in another one of the stereo images based on the disparity map; and deleting the corresponding relationship with respect to points in the area.

The identifying of the area may include generating curvature values for points corresponding to the disparity values; and identifying the area based on the curvature values.

The identifying of the area based on the curvature values may include determining a validity of the curvature values corresponding to points in a candidate area based on a distribution of the curvature values; and identifying the candidate area as the area that is visible in one of the stereo images but is not visible in another one of the stereo images in response to a result of the determining being that the curvature values of the points in the candidate area are not valid.

In another general aspect, a non-transitory computer-readable medium stores instructions that, when executed by one or more processors, cause the one or more processors to perform the image processing method described above.

Other features and aspects will be apparent from the following detailed description, the drawings, and the claims.

BRIEF DESCRIPTION OF THE DRAWINGS

Throughout the drawings and the detailed description, the same drawing reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although ordinal numbers such as "first" and "second" may be used to explain various components, the components are not limited by these ordinal numbers. Rather, these ordinal numbers are used only to distinguish one component from another component. For example, a "first" component alternatively may be referred to as a "second" component and a "second" component alternatively may be referred to as a "first" component without changing the scope of the disclosure.

When a component is referred to as being "connected to" another component, the component may be directly connected or coupled to the other component, or intervening components may be present the two components.

In this application, the singular forms include the plural forms as well, unless the context clearly indicates otherwise. Connecting words such as "comprising," "including," and "having" and their various forms specify the presence of stated features, numbers, operations, elements, components, or combinations thereof, but do not preclude the presence or addition of one or more other features, numbers, operations, elements, components, or combinations thereof.

Unless otherwise defined herein, all terms used herein, including technical or scientific terms, have the same meanings as those generally understood by one of ordinary skill in the art. Terms defined in general-purpose dictionaries are to be construed to have meanings matching with contextual meanings in the related art, and are not to be construed to have an ideal or excessively formal meaning unless otherwise defined herein.

Figure 1:
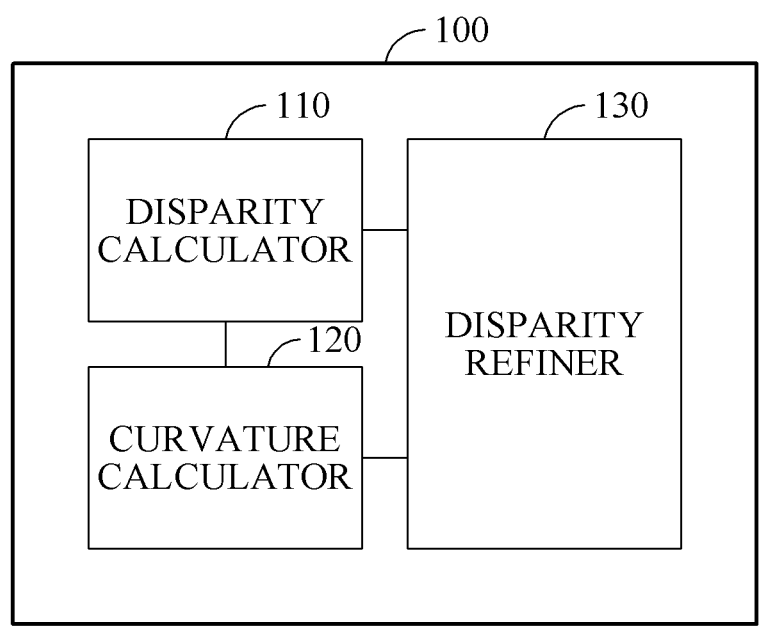
FIG. 1 is a block diagram illustrating an example of an image processing apparatus.

FIG. 1 illustrates an example of an image processing apparatus. Referring to FIG. 1, an image processing apparatus 100 includes a disparity calculator 110, a curvature calculator 120, and a disparity refiner 130. The disparity calculator 110, the curvature calculator 120, and the disparity refiner 130 are implemented by, for example, one or more processors and a memory storing instructions that, when executed by the one or more processors, cause the one or more processors to perform the functions of the disparity calculator 110, the curvature calculator 120, and the disparity refiner 130.

The disparity calculator 110 calculates a disparity value for calculation of a depth value from an input stereo image or a plurality of images. The disparity calculator 110 sets a corresponding relationship between pixels in the stereo image or the plurality of images, and calculates a disparity value based on a difference between corresponding pixels. To set a relationship between pixels in the stereo image or the plurality of images, color information in the images may be used.

The curvature calculator 120 calculates a depth value of a point in an image based on the disparity value calculated by the disparity calculator 110 and estimates a curvature value of the point based on the depth value. The point may be, for example, a single pixel or a set of a plurality of neighboring pixels. The curvature value may, for example, represent a curvature of a surface of an object in the stereo image or the plurality of images.

Alternatively, the curvature calculator 120 extracts an intrinsic image from at least one image among the input stereo image or the plurality of images, extracts a shading component of the at least one image based on the intrinsic image, and estimates a curvature value of a point in an image based on the extracted shading component. For example, a curvature value of each point may be estimated based on a gradation distribution of at least one area in the extracted shading component. The intrinsic image may contain, for example, one intrinsic characteristic of the stereo image or the plurality of images, such as, for example, a shading component, a shadow component, or a reflection component.

The curvature calculator 120 extracts an edge based on color information of the input stereo image or the plurality of images and identifies a discontinuous area based on the extracted edge and the depth value. For example, the curvature calculator 120 may estimate a curvature value of each point in the discontinuous area to refine a disparity value in the discontinuous area under an assumption that an error in a depth value is included in the discontinuous area. The discontinuous area may be, for example, an area in which there is an abrupt change in a depth value between adjacent pixels, for example at a boundary between a foreground and a background of the stereo image or the plurality of images.

The curvature calculator 120 determines a validity of the estimated curvature value. For example, the curvature calculator 120 determines whether a curvature value of each of points in at least one area of stereo images is valid enough to have meaning based on a distribution of the curvature values. For example, when a distribution of curvature values of each of points in an area does not have a predetermined pattern or tendency, the curvature values may be determined to be invalid. Through the above process of determining a validity, the image processing apparatus 100 refines a disparity value based on curvature values that are correctly identified.

The curvature calculator 120 calculates a curvature value based on a direction of a disparity between stereo images. For example, when a horizontal disparity is generated between a left image and a right image, the curvature calculator 120 calculates a curvature value in a horizontal direction.

The disparity refiner 130 refines a disparity value based on the curvature value calculated by the curvature calculator 120. The disparity refiner 130 refines a disparity value in an area identified as a discontinuous area by the curvature calculator 120.

The disparity refiner 130 determines whether a corresponding relationship between stereo images is erroneously set based on the curvature value calculated by the curvature calculator 120. For example, the disparity refiner 130 identifies an area that is visible only in a single image among the stereo images based on the curvature value. In the identified area, it is impossible to set a corresponding relationship between stereo images. Accordingly, the disparity refiner 130 determines that the corresponding relationship is erroneously set in the identified area, and refines the disparity value by deleting the corresponding relationship.

An example of an error in a corresponding relationship between pixels and an example of refining a disparity value will be further described with reference to FIGS. 5A and 5B below.

Figure 2A:
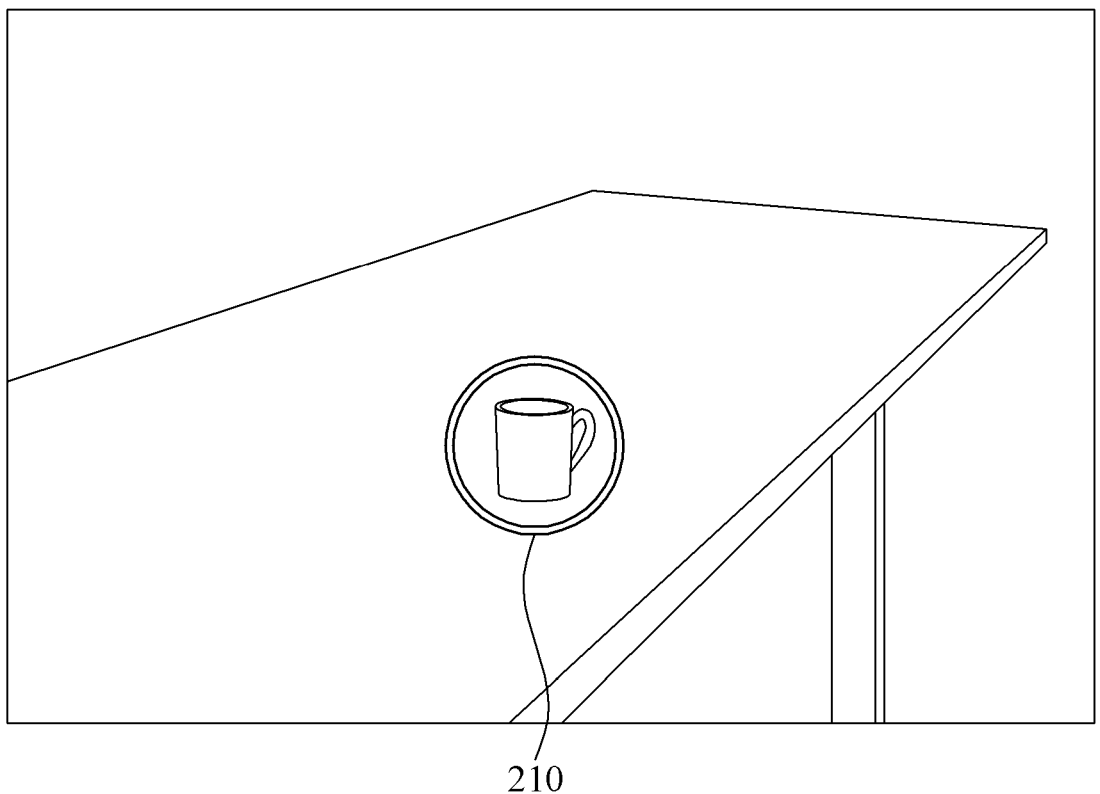
FIGS. 2A and 2B are diagrams illustrating an example of an error in a corresponding relationship between pixels in stereo images.
Figure 2B:
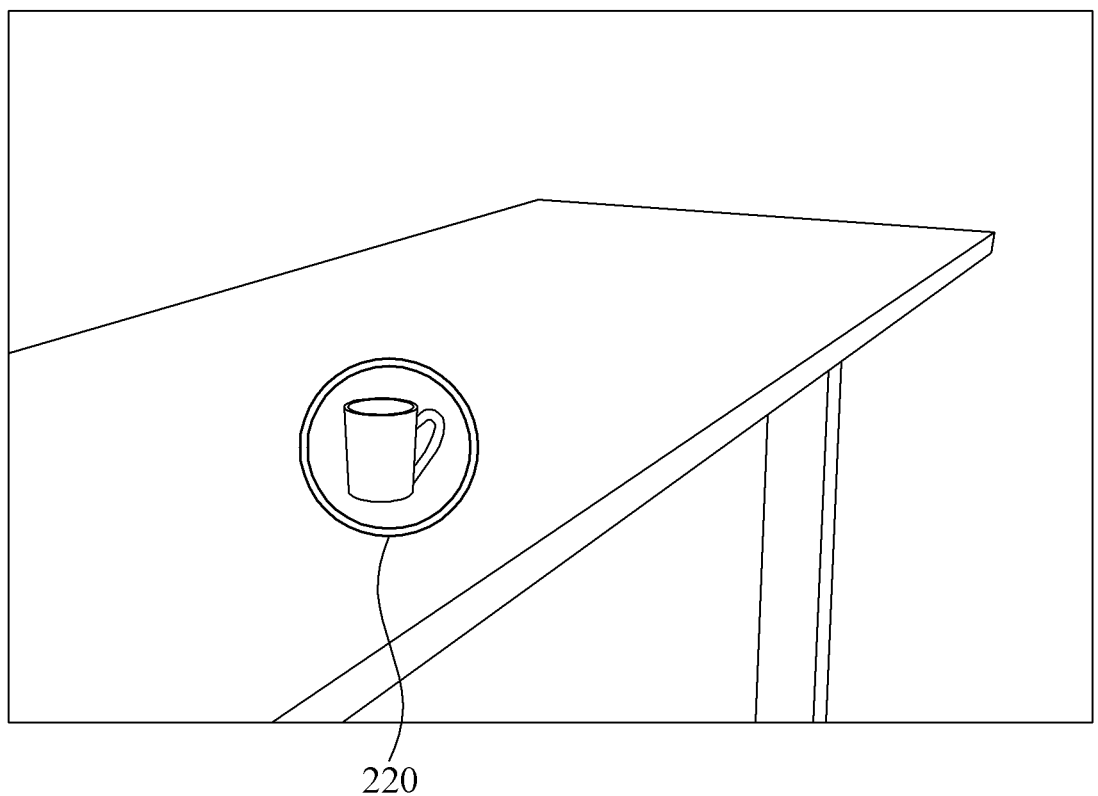

FIGS. 2A and 2B illustrate an example of an error in a corresponding relationship between pixels in stereo images. FIGS. 2A and 2B respectively illustrate a left image and a right image representing the same scene in a stereo image.

In each of the left image and the right image, an object includes a curved surface. A cup of FIGS. 2A and 2B is provided as an example of an object with a predetermined curvature. A location disparity exists between a cup 210 of the left image of FIG. 2A and a cup 220 of the right image of FIG. 2B, and a calculator of an image processing apparatus sets a corresponding relationship between pixels in stereo images and calculates a disparity value for each of the pixels.

However, when a corresponding relationship between stereo images is set based on only color values in a low texture environment, an accuracy of calculation of a disparity value and calculation of a depth value may decrease. As a result, a depth value of a boundary line of an object in an image may be incorrectly calculated and have an error. To alleviate the above problem, an image processing apparatus described in this application corrects an error in the corresponding relationship between the stereo images based on a curvature value of an object or an area.

Figure 3:
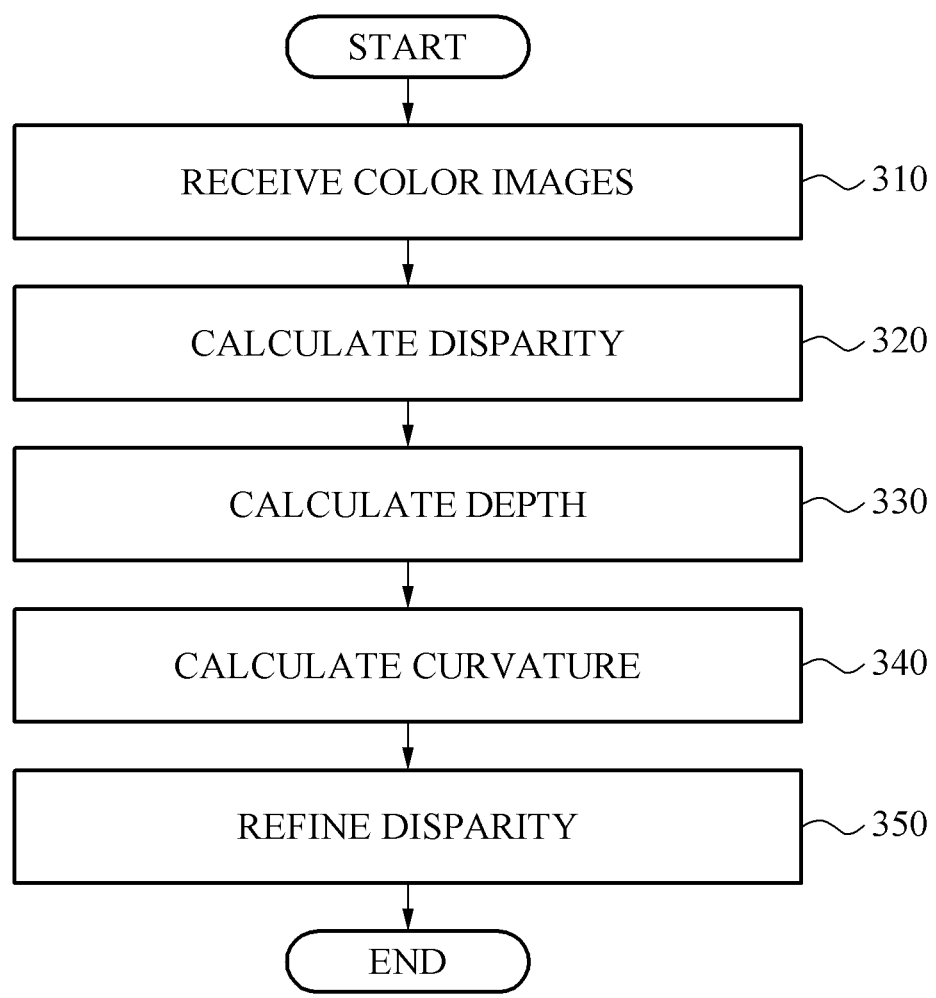
FIG. 3 is a flowchart illustrating an example of an image processing method.

FIG. 3 illustrates an example of an image processing method. The image processing method of FIG. 3 is performed by, for example, the image processing apparatus 100 of FIG. 1.

Referring to FIG. 3, in operation 310, a plurality of color images are received as inputs. The plurality of received color images include, for example, a stereo image including a left image and a right image representing the same scene. The plurality of color images may be captured directly by an image processing apparatus instead of being captured in advance and received.

In operation 320, a disparity value is calculated from the plurality of color images. To calculate the disparity value, a corresponding relationship between pixels in the plurality of color images is set. The disparity value is calculated based on a location difference between the pixels with the corresponding relationship.

In operation 330, a depth value of a point in an image is calculated based on the disparity value calculated in operation 320. The point is, for example, a single pixel or a set of a plurality of neighboring pixels.

In operation 340, a curvature value of the point is calculated based on the depth value calculated in operation 330. To calculate the curvature value, the depth value of the point and a distance between cameras that capture stereo images may be used. The calculated curvature value may be associated with a curvature based on a direction of a disparity between stereo images. In one example, a stereo image includes a left image and a right image, and a disparity between the left image and the right image occurs in a horizontal direction. In such a case, the calculated curvature value is associated with a curvature based on a horizontal direction. By analyzing a distribution of calculated curvature values, a curvature value in an area that does not have a predetermined pattern or tendency may be recognized as not being a valid value.

In operation 350, the disparity value calculated in operation 320 is refined based on the curvature value calculated in operation 340. For example, whether a corresponding relationship between stereo images is erroneously set is determined based on the curvature value. In this example, when the corresponding relationship is determined to be erroneously set, the disparity value is refined by deleting or modifying the corresponding relationship to increase an accuracy of calculation of a depth value. In one example, the corresponding relationship is modified by reassigning the corresponding relationship. The modification may be based on additional information about the corresponding relationship, and the additional information is not limited to any particular content or format.

Figure 4:
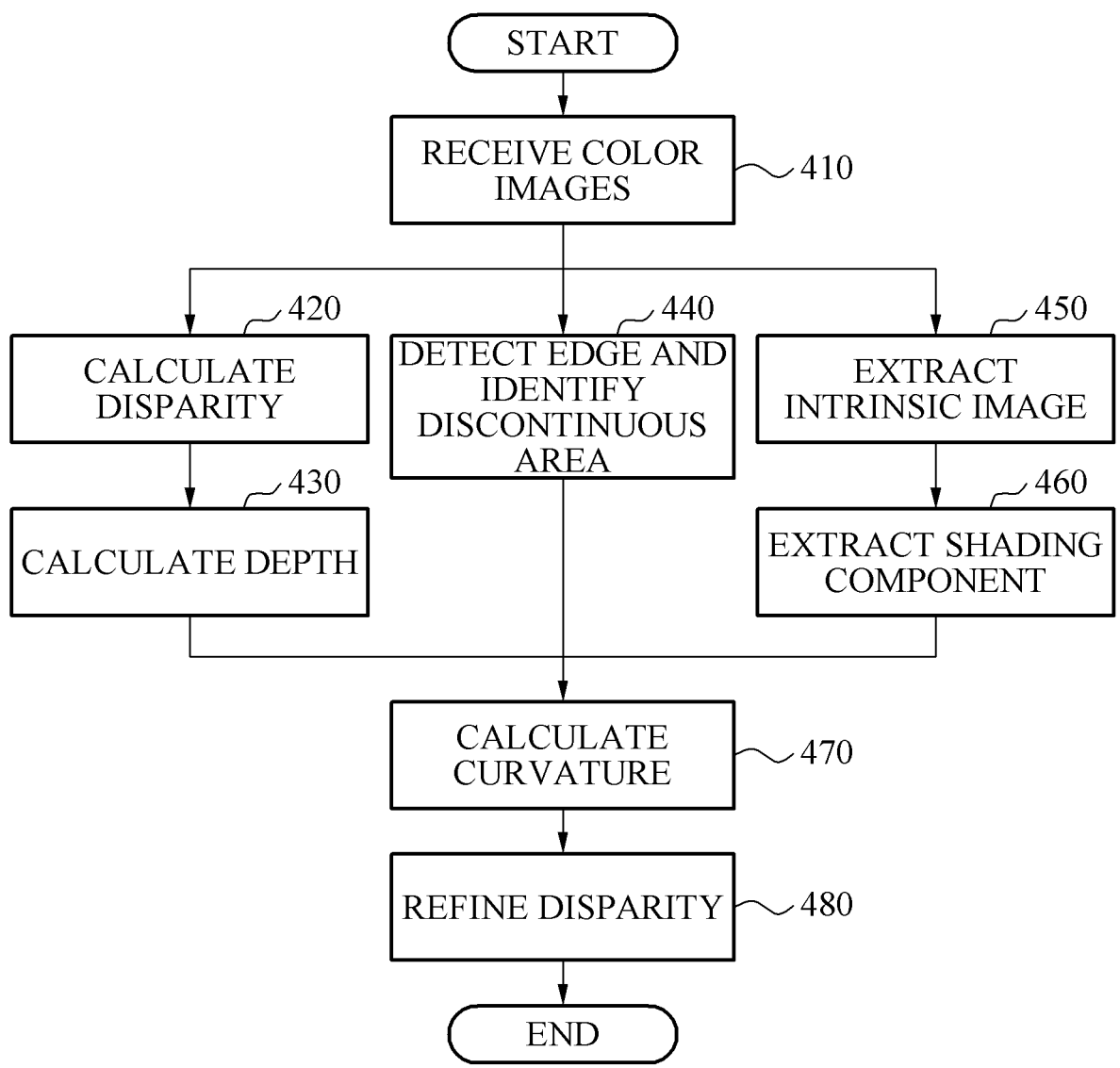
FIG. 4 is a flowchart illustrating another example of an image processing method.

FIG. 4 illustrates another example of an image processing method. The image processing method of FIG. 4 is performed by, for example, the image processing apparatus 100 of FIG. 1.

Referring to FIG. 4, in operation 410, a plurality of color images are received as inputs. The plurality of received color images include, for example, a stereo image including a left image and a right image representing the same scene. The plurality of color images may be captured directly by an image processing apparatus instead of being captured in advance and received.

In operation 420, a disparity value is calculated from the plurality of color images. To calculate the disparity value, a corresponding relationship between pixels in the plurality of color images is set. The disparity value is calculated based on a location difference between the pixels with the corresponding relationship.

In operation 430, a depth value of a point in an image is calculated based on the disparity value calculated in operation 420. The point is, for example, a single pixel or a set of a plurality of neighboring pixels.

In operation 440, an edge is detected from at least one of the plurality of color images. When an edge is detected based on color information in at least one of the plurality of color images, a discontinuous area is identified based on the detected edge.

In operation 450, an intrinsic image is extracted from at least one of the plurality of color images. The intrinsic image is extracted to reflect lighting information or shading information of a surface in calculation of a curvature.

In operation 460, a shading component is extracted from at least one of the plurality of color images based on the intrinsic image extracted in operation 450. For example, a shading component corresponding to at least one of the plurality of color images is extracted by a scheme of removing an albedo component from an intrinsic image.

In operation 470, a curvature value of each of points in the discontinuous area identified in operation 440 is calculated based on the depth value calculated in operation 430 and/or the shading component extracted in operation 460. To calculate the curvature value, a depth value of each of the points and a distance between cameras that capture stereo images may be used. The calculated curvature value may be associated with a curvature based on a direction of a disparity between stereo images. By analyzing a distribution of calculated curvature values, a curvature value in an area that does not have a predetermined pattern or tendency may be recognized as not being a valid value.

In operation 480, the disparity value calculated in operation 420 is refined based on the curvature value calculated in operation 470. For example, whether a corresponding relationship between stereo images is erroneously set is determined based on the curvature value. In this example, when the corresponding relationship is determined to be erroneously set, the disparity value is refined by deleting or modifying the corresponding relationship to increase an accuracy of calculation of a depth value.

Figure 5A:
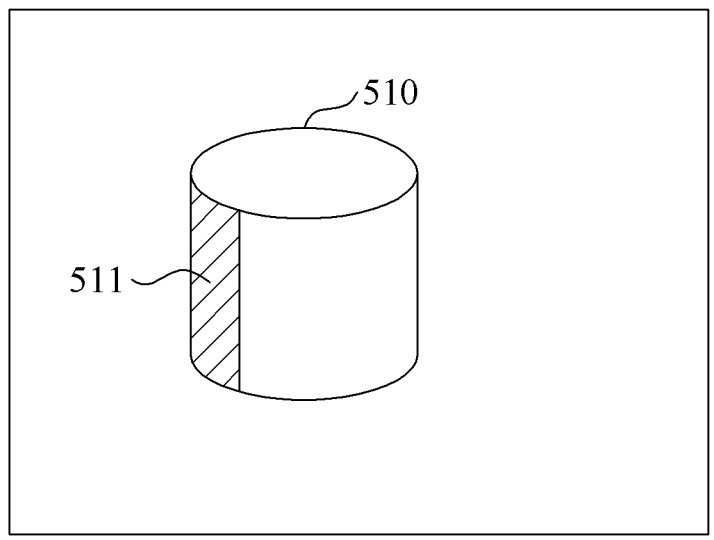
FIGS. 5A and 5B are diagrams illustrating an example in which a disparity value is refined.
Figure 5B:
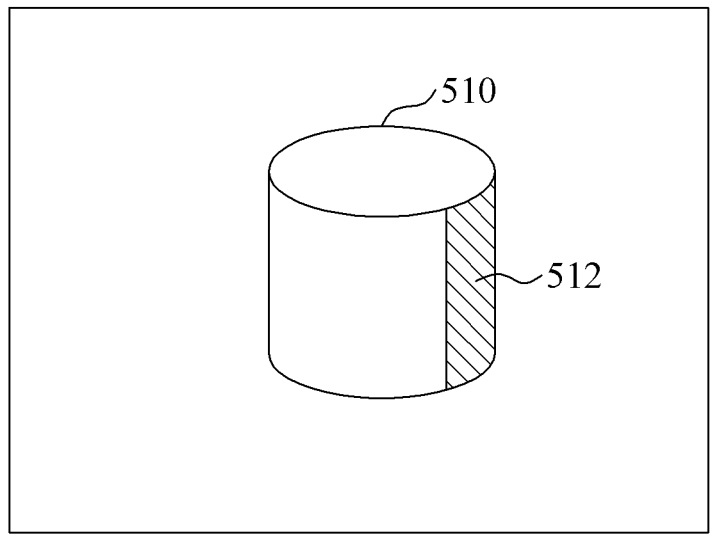

FIGS. 5A and 5B illustrate an example in which a disparity value is refined. FIGS. 5A and 5B respectively illustrate a left image and a right image representing the same scene in a stereo image.

In FIGS. 5A and 5B, an object 510 has a curved surface. The object 510 is expected to have a predetermined curvature based on a characteristic of the curved surface. An image processing apparatus identifies an area that is visible in a single image among stereo images based on a calculated curvature. For example, the image processing apparatus identifies an area 511 that is visible in the left image of FIG. 5A and is not visible in the right image of FIG. 5B, and an area 512 that is visible in the right image of FIG. 5B and is not visible in the left image of FIG. 5A. In the areas 511 and 512, it is impossible to set a corresponding relationship between the left image and the right image. Thus, the image processing apparatus determines that a corresponding relationship between the left image and the right image is erroneously set in the areas 511 and 512, deletes the corresponding relationship, and refines a disparity value.

Figure 6:
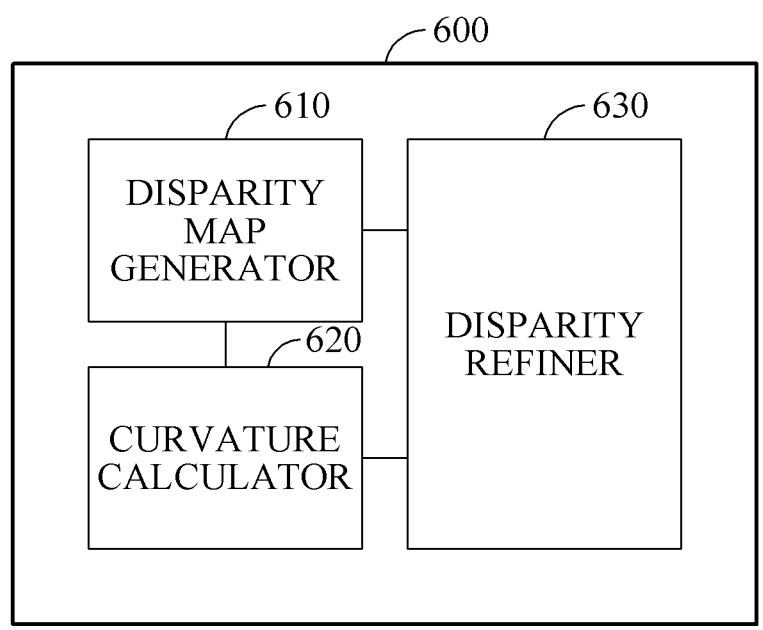
FIG. 6 illustrates another example of an image processing apparatus.

FIG. 6 illustrates another example of an image processing apparatus. Referring to FIG. 6, an image processing apparatus 600 includes a disparity map generator 610, a curvature calculator 620, and a disparity refiner 630. The disparity map generator 610, the curvature calculator 620, and the disparity refiner 630 are implemented by, for example, one or more processors and a memory storing instructions that, when executed by the one or more processors, cause the one or more processors to perform the functions of the disparity map generator 610, the curvature calculator 620, and the disparity refiner 630.

The disparity map generator 610 generates a disparity map based on a corresponding relationship between stereo images. The disparity map has the same number of pixels as each of the stereo images, and the value of each pixel of the disparity map is the disparity value of corresponding pixels in the stereo images.

The curvature calculator 620 extracts an intrinsic image from at least one of the stereo images, and calculates a curvature value corresponding to each of points in at least one area of the stereo images based on the intrinsic image and the disparity map. The curvature calculator 620 may extract a shading component from the at least one of the stereo images based on the intrinsic image, and calculate the curvature value based on the shading component. The curvature calculator 620 may determine a validity of the curvature value based on a distribution of curvature values respectively corresponding to points in at least one area of the stereo images.

The disparity refiner 630 refines a disparity value corresponding to each of the points in the at least one area based on the curvature value.

The descriptions of FIGS. 1 to 5B are also applicable to the image processing apparatus illustrated in FIG. 6, and thus will not be repeated here.

Figure 7:
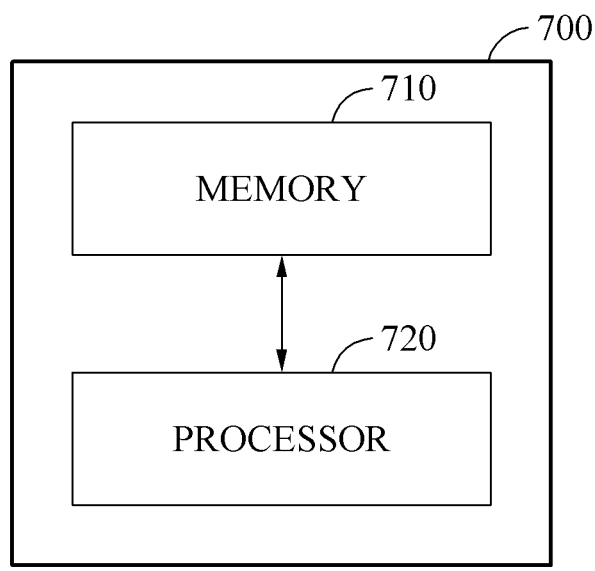
FIG. 7 illustrates another example of an image processing apparatus.

FIG. 7 illustrates another example of an image processing apparatus. Referring to FIG. 7, an image processing 700 includes a memory 710 storing instructions, and a processor 720 that executes the instructions stored in the memory 710 to perform the functions of the disparity calculator 110, the curvature calculator 120, and the disparity refiner in FIG. 1, or the disparity map generator 610, the curvature calculator 620, and the disparity refiner 630 in FIG. 6. Although the example of the image processing apparatus 700 in FIG. 7 includes one processor 720, this is merely an example, and the image processing apparatus 700 may include two or more processors.

The descriptions of FIGS. 1 to 6 are also applicable to the image processing apparatus illustrated in FIG. 7, and thus will not be repeated here.

The image processing apparatus 100, the disparity calculator 110, the curvature calculator 120, and the disparity refiner in FIG. 1 and the image processing apparatus 600, the disparity map generator 610, the curvature calculator 620, and the disparity refiner 630 in FIG. 6 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3 and 4 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed:

1. An image processing apparatus comprising:
   one or more processors configured to:
   calculate a disparity value of a first point in stereo images,
   calculate a depth value of the first point based on the disparity value,
   calculate a curvature value of the first point based on the depth value, and
   refine the disparity value based on the curvature value.

2. The image processing apparatus of claim 1, further comprising a memory configured to store instructions;
   wherein the one or more processors are further configured to execute the instructions to configure the processor to:
   calculate the disparity value of the first point in the stereo images,
   calculate the depth value of the first point based on the disparity value,
   calculate the curvature value of the first point based on the depth value, and
   refine the disparity value based on the curvature value.

3. The image processing apparatus of claim 1, wherein the one or more processors are further configured to:
   extract an intrinsic image from at least one of the stereo images, and
   calculate the curvature value based on the intrinsic image.

4. The image processing apparatus of claim 3, wherein the one or more processors are further configured to:
   extract a shading component from the at least one of the stereo images based on the intrinsic image, and
   calculate the curvature value based on the shading component.

5. The image processing apparatus of claim 1, wherein the one or more processors are further configured to determine a validity of the curvature value corresponding to the first point based on a distribution of curvature values respectively corresponding to points in at least one area of the stereo images.

6. The image processing apparatus of claim 1, wherein the curvature value is associated with a curvature based on a direction of a disparity between the stereo images.

7. The image processing apparatus of claim 1, wherein the one or more processors are further configured to:
   determine whether a corresponding relationship between the stereo images is erroneously set at the first point, and
   delete the corresponding relationship in response to a result of the determining being that the corresponding relationship is erroneously set.

8. The image processing apparatus of claim 7, wherein the one or more processors are further configured to:
   identify an area that is visible in one of the stereo images but is not visible in another one of the stereo images based on a distribution of curvature values respectively corresponding to points in at least one area of the stereo images, and
   determine that the corresponding relationship is erroneously set at the first point in response to the first point being located in the identified area.

9. The image processing apparatus of claim 1, wherein the one or more processors are further configured to:
   extract an edge based on a color value corresponding to each of points in at least one area of the stereo images,
   identify a discontinuous area based on the extracted edge, and
   refine a disparity value corresponding to the discontinuous area.

10. An image processing apparatus comprising:
    one or more processors configured to:
    generate a disparity map based on a corresponding relationship between stereo images,
    extract an intrinsic image from at least one of the stereo images;
    calculate a curvature value corresponding to each of points in at least one area of the stereo images based on the intrinsic image and the disparity map, and
    determine a validity of the calculated curvature value.

11. The image processing apparatus of claim 10, further comprising a memory configured to store instructions;
    wherein the one or more processors are further configured to execute the instructions to configure the processor to:
    generate the disparity map based on the corresponding relationship between the stereo images,
    extract the intrinsic image from the at least one of the stereo images, and
    calculate the curvature value corresponding to each of the points in the at least one area of the stereo images based on the intrinsic image and the disparity map.

12. The image processing apparatus of claim 10, wherein the one or more processors are further configured to:
    extract a shading component from the at least one of the stereo images based on the intrinsic image, and
    calculate the curvature value based on the shading component.

13. The image processing apparatus of claim 10, wherein the one or more processors are further configured to determine a validity of the curvature value based on a distribution of curvature values respectively corresponding to points in at least one area of the stereo images.

14. The image processing apparatus of claim 10, wherein the one or more processors are further configured to refine a disparity value in the disparity map corresponding to each of the points in the at least one area based on the curvature value.

15. An image processing method comprising:
calculating a disparity value of a first point in stereo images;
calculating a depth value of the first point based on the disparity value;
calculating a curvature value of the first point based on the depth value; and
refining the disparity value based on the curvature value.

16. The image processing method of claim 15, wherein the calculating comprises:
extracting an intrinsic image from at least one of the stereo images; and
calculating the curvature value based on the intrinsic image.

17. The image processing method of claim 15, wherein the refining comprises:
determining whether a corresponding relationship between stereo images is erroneously set at the first point; and
deleting the corresponding relationship in response to a result of determining being that the corresponding relationship is erroneously set.

18. The image processing method of claim 17, wherein the determining comprises:
identifying an area that is visible in one of the stereo images but is not visible in another one of the stereo images based on a distribution of curvature values respectively corresponding to points in at least one area of the stereo images; and
determining that the corresponding relationship is erroneously set at the first point in response to the first point, being located in the identified area.

19. A non-transitory computer-readable medium storing, instructions that, when executed by one or more processors, cause the one or more processors to perform the image processing method of claim 15.

20. An image processing method comprising:
generating a disparity map based on a corresponding relationship between pixels in stereo images;
generating curvature values for points corresponding to disparity values of the disparity map;
identifying an area that is visible in one of the stereo images but is not visible in another one of the stereo images based on the curvature values; and
deleting the corresponding relationship with respect to points in the area.

21. The image processing method of claim 20, wherein the identifying of the area based on the curvature values comprises:
determining a validity of the curvature values corresponding to points in a candidate area based on a distribution of the curvature values; and
identifying the candidate area as the area that is visible in one of the stereo images but is not visible in another one of the stereo images in response to a result of the determining being that the curvature values of the points in the candidate area are not valid.

22. A non-transitory computer-readable medium storing instructions that, when executed by one or more processors, cause the one or more processors to perform the image processing method of claim 20.

* * * * *